United States Patent [19]

Ishikawa

[11] Patent Number: 5,408,615
[45] Date of Patent: Apr. 18, 1995

[54] DIRECT MEMORY ACCESS METHOD AND MEMORY CONTROL APPARATUS

[75] Inventor: Yuuji Ishikawa, Yokohama, Japan

[73] Assignee: Canon Kabushiki Kaisha, Tokyo, Japan

[21] Appl. No.: 208,187

[22] Filed: Mar. 10, 1994

Related U.S. Application Data

[63] Continuation of Ser. No. 574,054, Aug. 29, 1990, abandoned.

[30] Foreign Application Priority Data

Aug. 31, 1989 [JP] Japan .................. 1-222815

[51] Int. Cl.⁶ .................. G06F 13/14; G06F 3/12
[52] U.S. Cl. .................. 395/275
[58] Field of Search .................. 395/400, 425, 275; 364/254.3, 255.8, DIG. 1; 365/238.5, 189.05

[56] References Cited

U.S. PATENT DOCUMENTS

| | | | |
|---|---|---|---|
| 3,914,747 | 10/1975 | Barnes et al. | 364/DIG. 1 |
| 4,403,282 | 9/1983 | Holberger et al. | 364/200 |
| 4,561,072 | 12/1985 | Arakawa et al. | 365/238.5 |
| 4,646,230 | 2/1987 | Eguchi | 364/DIG. 1 |
| 4,669,043 | 5/1987 | Kaplinsky | 364/DIG. 1 |
| 4,723,223 | 2/1988 | Hanada | 364/900 |
| 4,797,812 | 1/1989 | Kihara | 395/425 X |
| 4,797,851 | 1/1989 | Suzuki | 395/425 |
| 4,829,467 | 5/1989 | Ogata | 364/900 |
| 4,849,875 | 7/1989 | Fairman et al. | 364/DIG. 1 |
| 4,891,752 | 1/1990 | Fairman et al. | 364/DIG. 1 |

*Primary Examiner*—David L. Robertson
*Attorney, Agent, or Firm*—Fitzpatrick, Cella, Harper & Scinto

[57] ABSTRACT

Address data supplied from a system or the like is output to a storage memory constituting transfer destination and source memories as row and column address from an upper bit side in a normal memory access mode. In only a DMA operation mode, a value obtained by multiplying $2^n$ with the supplied address value is output to the storage memory as an output address value, and values from "0" to "$2^n-1$" are sequentially and automatically output to the memory as lower n bits, i.e., lower n bits of a column address. During this interval, the system is requested to prolong one bus cycle. Peripheral sections as objects of DMA transfer have a data buffer corresponding to at least $2^n$ words. A peripheral section for outputting data to the memory outputs a DMA request after at least $2^n$ data are present in the buffer. A peripheral section for receiving data from the memory outputs a DMA request when the buffer has an empty area corresponding to at least $2^n$ data. These peripheral sections are arranged to output or receive $2^n$-word data in accordance with a timing signal which is output from an address controller in synchronism with a change in lower n-bit address, thereby performing access in the high-speed page mode.

14 Claims, 5 Drawing Sheets

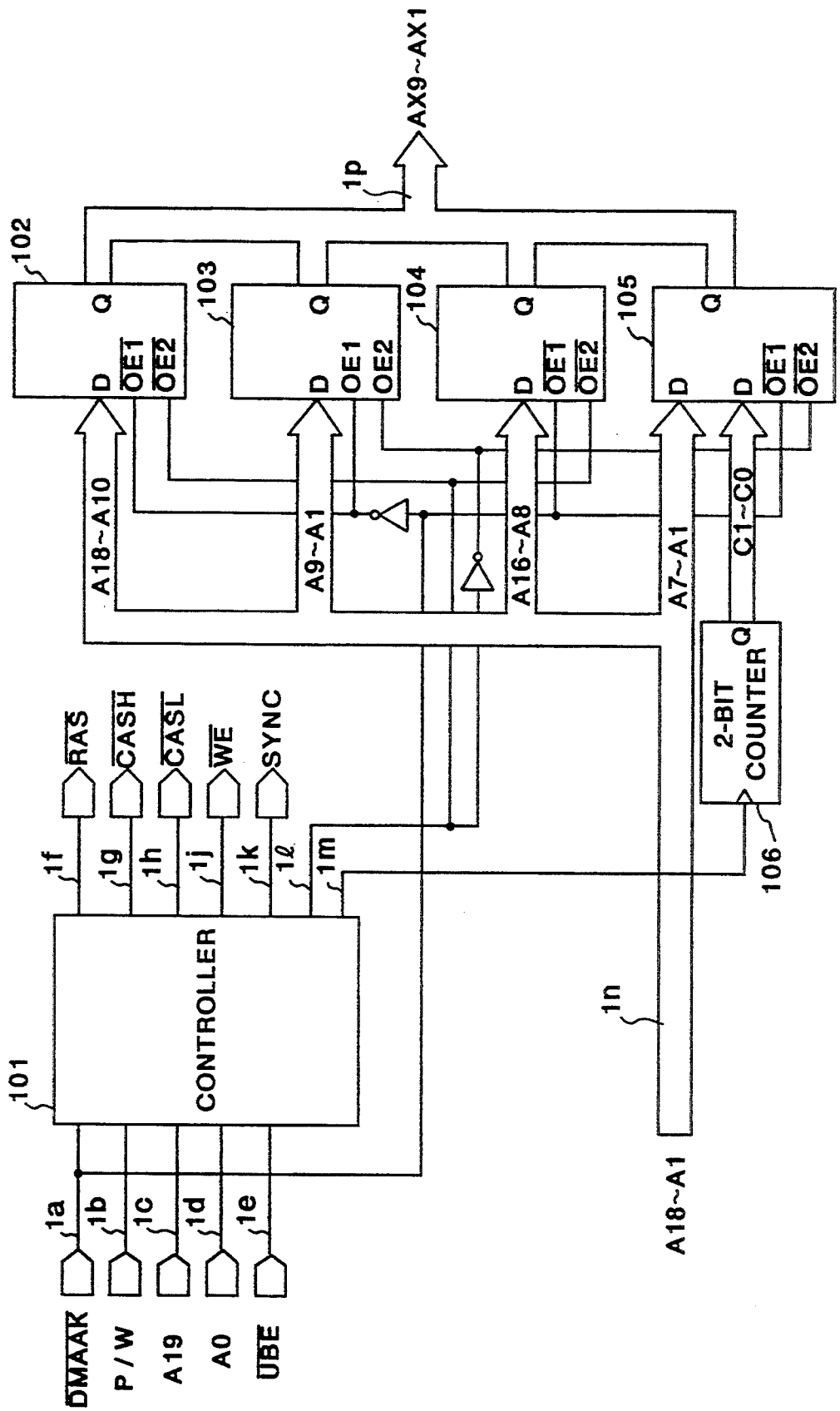
F I G. 2

DIRECT MEMORY ACCESS METHOD AND MEMORY CONTROL APPARATUS

This application is a continuation of application Ser. No. 07/574,054, filed Aug. 29, 1990, which is now abandoned.

BACKGROUND OF THE INVENTION

1. Field of the Invention

The present invention relates to a direct memory access method and a memory control apparatus, comprising an N-bit counter and an address generating means for multiplying $\frac{1}{2}^N$ with an address value of a transfer source or destination memory to generate a direct memory access reference address, for performing direct memory access of the transfer source or destination memory having a capacity of at least $2^N$ words.

2. Description of the Related Art

In a conventional facsimile apparatus having an image storage memory, a method of transferring a large volume of image encoding data from an encoder to the image storage memory or from the image storage memory to a decoder is preformed by a method of sequentially transferring data in units of words using a general-purpose direct memory access (to be referred to as "DMA" hereinafter) control LSI chip.

FIG. 5 is a block diagram of a typical DMA controller.

In FIG. 5, reference numeral 201 denotes an arithmetic processor (CPU) for controlling a system; 202, a DMA controller (DMAC) for performing DMA control including address value control executed when encoding data is DMA-transferred between an encoder/decoder 206 and a storage memory 207; 203, a reader for performing an original reading operation, and outputting binary pixel data of the read original image; 204, a memory for temporarily storing the binary pixel data; 205, a recorder for printing out the input binary pixel data on, e.g., a thermal recording sheet; 206, the encoder/decoder for receiving and encoding pixel data from a bus B and outputting the encoded data onto a bus A in an encoding mode, and for receiving and decoding encoded data from the bus A and outputting the decoded pixel data onto the bus B in a decoding mode; and 207, a storage memory for storing a large volume of encoded data. Reference symbols a1 and a2 denote a bus request signal for mediating the right of use of the bus A between the CPU 201 and the DMAC 202 and a response signal for the bus request signal a1; b1 and b2, a DMA request signal from the encoder/decoder 206 to the DMAC 202 and a response signal for the request signal b1; and C, an address signal for the storage memory 207, which is output from the CPU 201 in a normal operation, and is output from the DMAC 202 during a DMA operation.

Note that FIG. 5 is a schematic view illustrating only portions necessary for showing a flow of image data.

In the conventional facsimile apparatus with the above arrangement, when read data is stored in the storage memory 207, the read data from the reader 203 is stored in the memory 204.

The encoder/decoder 206 sequentially generates encoded data using data in the memory 204, and DMA-transfers the encoded data to the storage memory 207.

In contrast to this, when image data stored in the storage memory 207 is printed, printing data from the storage memory 207 is DMA-transferred to the encoder/decoder 206. Image data decoded by the encoder/decoder 206 is temporarily stored in the memory 204. The recorder 205 receives the image data from the memory 204.

With these operations, a memory storage operation of read data and a print-out operation of storage data are performed.

However, when the time required for DMA-transferring encoded data to the storage memory 207 per line continuously exceeds the time required for reading one-line data of the reader 203, an empty area of the memory 204 is used up, and the read operation must be temporarily interrupted.

In a recording operation, when the time required for DMA-transferring data to be decoded per line from the storage memory 207 to the encoder/decoder 206 exceeds the time required for the recorder 305 to print out one-line data, the memory 204 becomes completely empty, and there is no decoded data to be printed in the memory 204. For this reason, the print operation must be interrupted.

For these reasons, a long operation time is required, resulting in an inefficient operation.

In general, when image data is encoded by a modified Huffman code (to be abbreviated to as an "MH code" hereinafter) used in the facsimile apparatus, a data volume as a result of encoding is compressed to a fraction or less of original image data in most cases.

However, in a specific image pattern, a data volume of an encoded result is increased to several times an original image data length. In the worst case, a data volume of an encoded result may be increased to about six times an original image data length.

In recent years, many special-purpose LSIs for performing encoding/decoding processing of "MH and MR codes" are commercially available, and encoding/decoding processing itself can be executed at a very high speed.

However, since an encoded data volume is increased in a data transfer operation of the above-mentioned specific image pattern, even if DMA-transfer capable of performing high-speed data transfer is performed, a long time is required to transfer encoded data for one main scan line.

As processing speed of the encoder/decoder is increased, DMA data transfer must be performed more frequently, and the occupation ratio of the system bus by DMA is increased. For this reason, other processing operations are apt to be delayed for the entire facsimile system.

For these reasons, even in a conventional facsimile system using a special-purpose LSI capable of high-speed encoding/decoding processing, an encoded data length per line considerably varies depending on its image pattern. When original read data is stored in the image memory after MH or MR encoding, or when data in the image memory is decoded and printed, if an image pattern has a high density, a time required for transferring the corresponding encoded data undesirably exceeds a one-line processing time of the reader or the recorder.

Therefore, a feed operation in the sub-scan direction must be inevitably intermittently performed.

The intermittent sub-scan driving operation delays the read and recording operations.

This also causes an increase in noise in the driving operation, and feed nonuniformity in the sub-scan direction. As an image pattern has a higher density, a higher resolution is required. However, image quality is degraded due to the feed nonuniformity.

SUMMARY OF THE INVENTION

The present invention has been made to solve the above-mentioned problems.

More specifically, it is an object of the present invention to provide a direct memory access method and a memory control apparatus, which are best suitable for a high-image quality facsimile apparatus which can shorten a time required for data transfer between a storage memory and an encoder/decoder as compared to a main scan time for one line by a reader and a print-out time for one line by a recorder, allows efficiently high-speed, equal-speed read and printing operations, and is free from feed nonuniformity.

As means for achieving the above object, a memory control apparatus of the present invention comprises the following arrangement.

More specifically, the memory control apparatus comprises a transfer source or destination memory having a capacity of at least $2^N$ words, an N-bit counter, address generating means for multiplying $\frac{1}{2}^N$ with an address value of the transfer source or destination memory to generate a DMA reference address, and DMA control means for multiplying $2^N$ with the DMA reference address generated by the address generating means to generate a DMA address which includes a counter value of the N-bit counter as lower N bits, and repeating data transfer $2^N$ times while incrementing the N-bit counter for each data transfer.

With the above arrangement, data transfer of $2^N$ words can be performed in one cycle, and high-speed efficient DMA transfer can be achieved.

For example, in an embodiment of the present invention, in an address controller, in the DMA control means, for outputting address data supplied from, e.g., a system as row and column addresses from an upper bit side to a storage memory such as a dynamic RAM (DRAM) constituting the transfer source or destination memory, the address data are output in the above-mentioned arrangement in a normal memory access mode. In only a DMA operation mode, an input address value is multiplied with $2^n$ to generate an output address value, and values from "0" to "$2^n-1$" are automatically and sequentially output as lower n bits, i.e., lower n bits of the column address. During this interval, the system is requested to prolong one bus cycle.

Peripheral sections as objects of DMA transfer have a data buffer corresponding to at least $2^n$ words. A peripheral section for outputting data to the memory outputs a DMA request after at least $2^n$ data are present in the buffer. A peripheral section for receiving data from the memory outputs a DMA request when the buffer has an empty area corresponding to at least $2^n$ data. These peripheral sections are arranged to output or receive $2^n$-word data in accordance with a timing signal which is output from an address controller in synchronism with a change in lower n-bit address.

Thus, access by the above-mentioned high-speed page mode is allowed.

As a result, a time required for transferring $2^n$ words can be considerably shortened as compared to a case wherein conventional DMA transfer of one word per bus cycle is executed.

Since a time interval between adjacent DMA requests is prolonged, a throughput of the system can be improved.

In the above-mentioned control, a setup value of a DMA address for a DMA controller must be a value obtained by multiplying $\frac{1}{2}^n$ with a target address value.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

FIG. 2 is a block diagram of a memory control unit in this embodiment;

DETAILED DESCRIPTION OF THE PREFERRED EMBODIMENT

[Embodiment]

An embodiment of the present invention will be described hereinafter with reference to the accompanying drawings.

Figure 1:
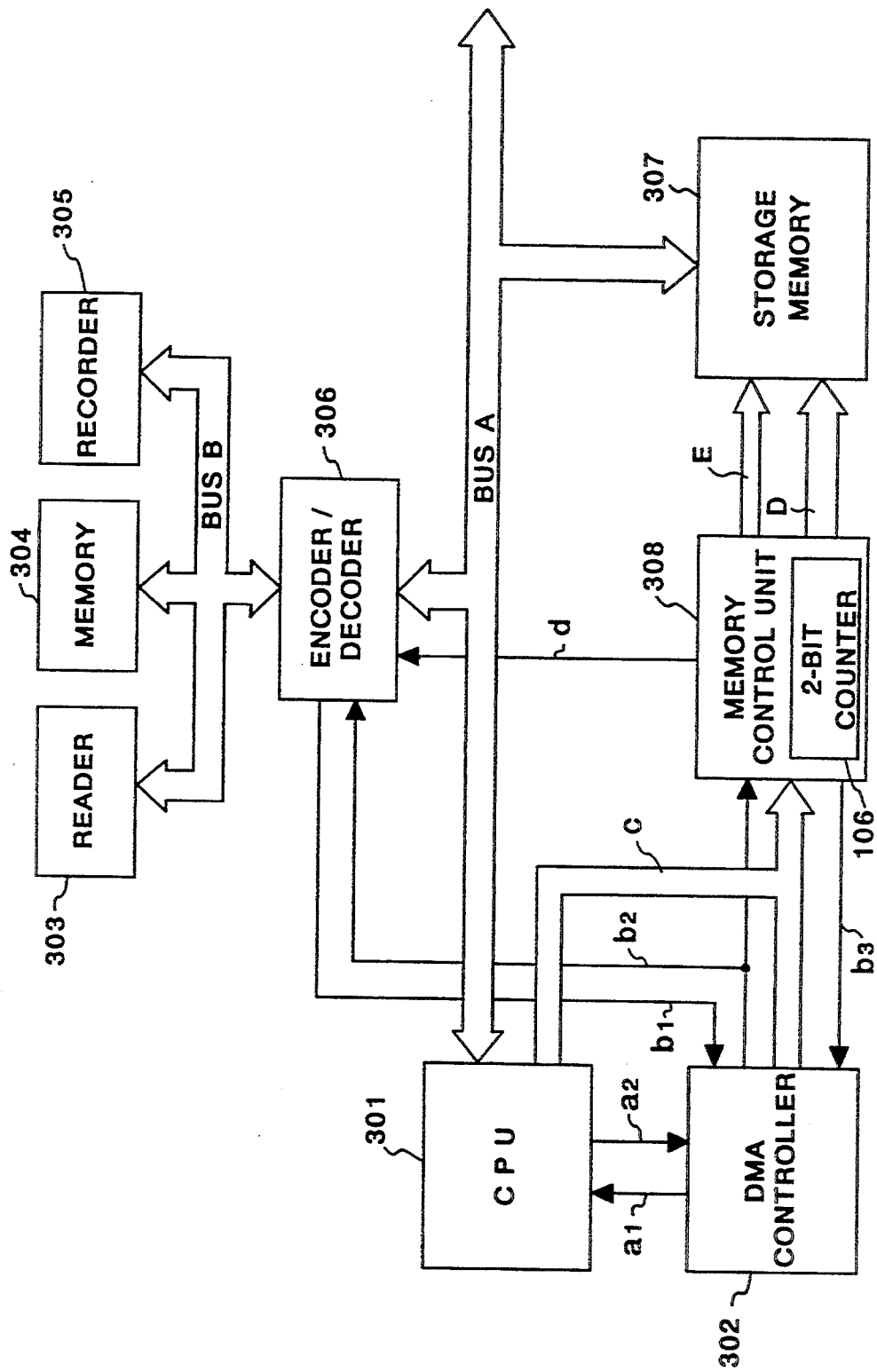
FIG. 1 is a block diagram of a facsimile system having a storage memory according to an embodiment of the present invention.
Figure 3:
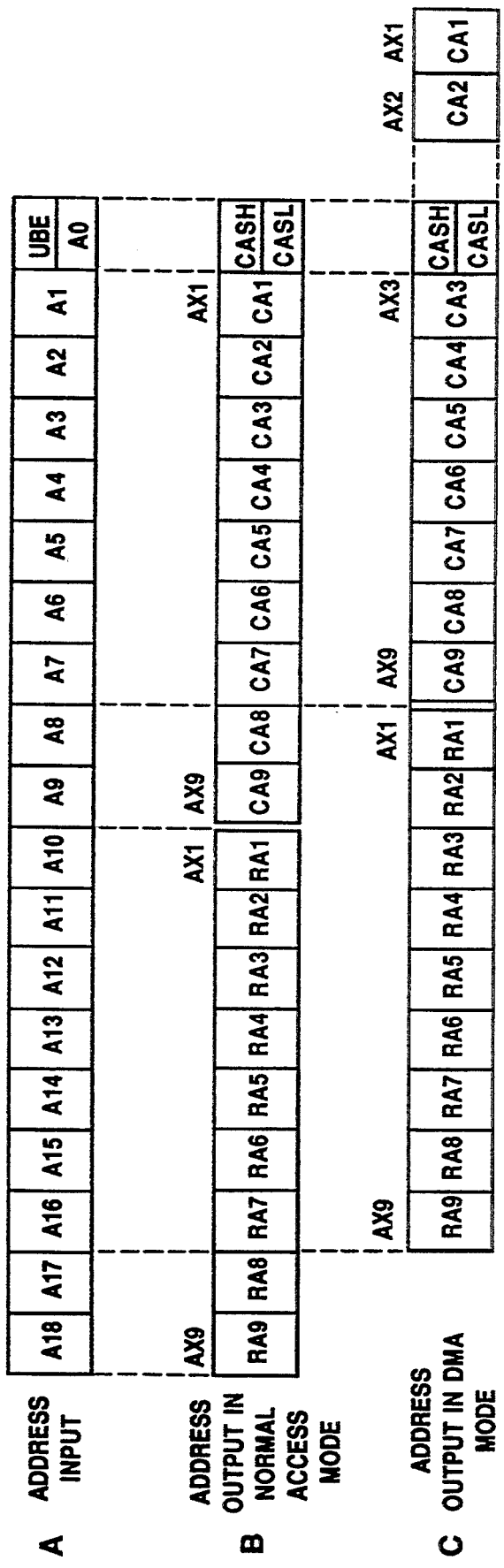
FIG. 3 is a chart showing the relationship between system addresses and address values given to the storage memory in this embodiment.

FIGS. 1, 2, and 3 show an embodiment of the present invention.

In this embodiment, a 512KB dynamic RAM (DRAM) is used as a storage memory, and a data bus is 16-bits wide.

In the system of this embodiment, four-word (n=2) data are transferred during one DMA cycle. As a DRAM access method in a DMA mode, a high-speed page mode is used.

This embodiment will be described in detail below.

Figure 5:
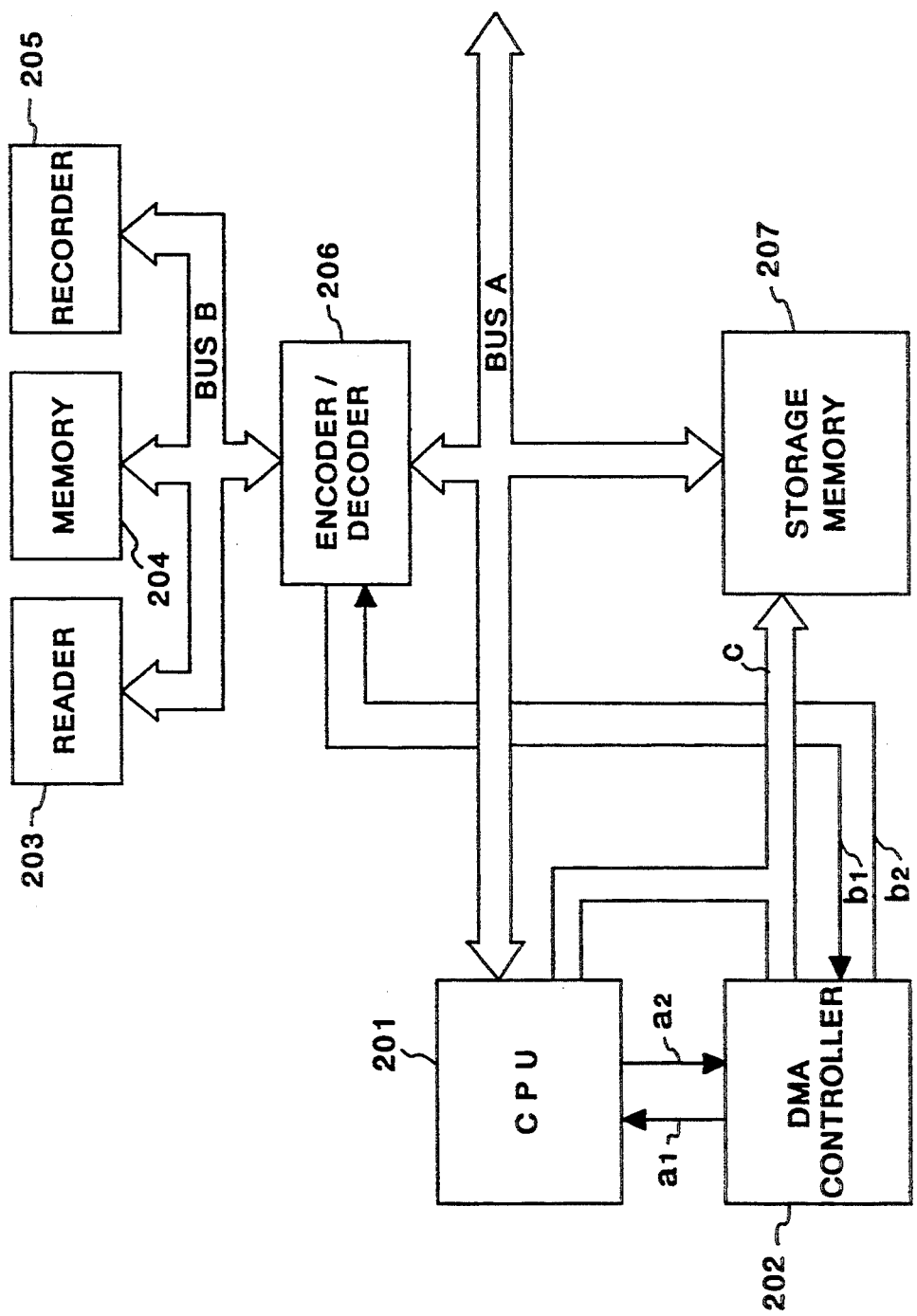
FIG. 5 is a block diagram showing a conventional facsimile system having a storage memory.

FIG. 1 is a schematic block diagram of the system of this embodiment, and the same reference numerals in FIG. 1 denote the same parts as in FIG. 5.

In FIG. 1, reference numeral 301 denotes a central processing unit (CPU) for controlling the overall embodiment; and 302 a DMA controller (to be referred to as a "DMAC" hereinafter) for acquiring the right of use of a bus from the CPU 301 in response to a DMA request from a connected I/O device, e.g., an encoder/decoder (peripheral section), outputting a enable signal to the DMA requesting peripheral section, and outputting a memory address as a transfer object in place of the CPU 301.

Reference numeral 303 denotes a reader for performing an original reading operation and outputting read binary pixel data; 304, a buffer memory for temporarily storing the binary pixel data; 305, a recorder for printing out the input binary pixel data on, e.g., a thermal recording sheet; and 306, an encoder/decoder having a buffer of 4 words or more in a data input/output section with a bus A. The encoder/decoder 306 receives binary pixel data from a bus B in an encoding mode, and outputs encoded MH or MR codes onto the bus A. In a decoding operation mode, the encoder/decoder 306 performs an operation opposite to that described above.

Reference numeral 307 denotes a storage memory (also referred to as a transfer source of destination memory) having a capacity of 256 Kbits × 16 bits; and 308, a memory control unit for generating various control signals (e.g., RAS, CAS, a multiplexed address bit, and the like) for accessing the storage memory 307 used as the DRAM, and generating a multiplex address to be output to the DRAM (storage memory 307) in a DMA access mode. The memory control unit 308 comprises a 2-bit counter 106, generates a DMA address obtained by multiplying 4 ($2^2$) with an input address value, and outputs values "0", "1", "2", and "3" as a count value of the 2-bit counter 106 in lower 2 bits which become "0" as a result of multiplication.

Reference symbols a1 and a2 denote signals for mediating the right of use of the bus between the CPU 301 and the DMAC 302 as described above; b1, a DMA RQ signal as a DMA request from the encoder/decoder 306; b2, a $\overline{\text{DMA AK}}$ signal as a DMA operation enable signal; b3, a signal for requesting the DMAC 302 to prolong a DMA cycle until transfer of four words is completed upon execution of a DMA operation; d, a signal indicating a timing for outputting four-word data to a bus when encoded data is output from the encoder of the encoder/decoder 306 or when the decoder receives encoded data; C, an address signal including address signal pulses ($A_0$) to ($A_{19}$) and a signal indicating validity/invalidity of odd address data (upper bytes) in correspondence with a 16-bit bus width; D, a 9-bit multiplexed address signal for the storage memory 307; and E, a status signal for the storage memory 307. The status signal includes:

A row address strobe signal ($\overline{\text{RAS}}$), a column address strobe signal ($\overline{\text{CAS(H)}}$) for an odd address, a column address strobe signal ($\overline{\text{CAS(L)}}$) for an even address, and a write enable signal ($\overline{\text{WE}}$) for the memory.

An operation of this embodiment with the above arrangement will be described below with reference to a case wherein encoded data is stored in the memory.

The encoder/decoder 306 performs MH or MR coding of pixel data stored in the memory 304 to generate 4-word encoded data. The encoder/decoder 306 then issues a DMA request by the signal b1 to the DMAC 302.

The DMAC 302 requests the right of use of the bus to the CPU 301 by the signal a1. When the CPU 301 permits the use of the bus by the signal a2, the DMAC 302 signals start of a DMA operation to the encoder/decoder 306 and the memory control unit 308 by the signal b2, and outputs a memory address as a DMA object onto a 20-bit address bus.

The memory control unit 308 normally outputs (A18) to (A10) of the system address bus C as a row address signal of multiplexed address bits (AX9) to (AX1) to the storage memory 307. However, when the memory control unit 308 recognizes based on the signal b2 that a bus cycle is in a DMA operation mode, it outputs (A16) to (A8) of the system address bus C as a row address signal.

At the same time, the memory control unit 308 outputs the signal b3 for requesting the DMAC 302 to prolong a bus cycle than a normal cycle.

With the above-mentioned control, (A16) to (A8) are supplied as a row address of the storage memory 307.

Then, as a column address, (A7) to (A1) of the address bus C are output for (AX9) to (AX3) of the address bus D, and "0" is output for (AX2) and (AX1). In this state, negative pulses are output as $\overline{\text{CASH}}$ and $\overline{\text{CASL}}$ signals, thereby executing a DMA operation for a RAM area on addresses given by:

{(value of address bus C)×4}+0 and +1 (since word transfer is performed in this embodiment, even-/odd addresses are equal to each other).

The 2-bit counter 106 is incremented to change only (AX1) from "0" to "1", and a sync signal is output by the signal d to the encoder/decoder 306 to output the next data word. Negative pulses are then output as the $\overline{\text{CASH}}$ and $\overline{\text{CASL}}$ signals again. In this case, a DMA operation is executed in turn for a RAM area on addresses given by:

{(value of address bus C)×4}+2 and +3

Similarly, operations with (AX2, AX1)=(1, 0) and (AX2, AX1)=(1, 1) by sequentially incrementing the 2-bit counter 106 are repeated to execute DMA operations for RAM areas corresponding to address values given by:

{(value of address bus C)×4}+4 and +5
{(value of address bus C)×4}+6 and +7

FIG. 2 shows a detailed arrangement of the memory control unit 308 shown in FIG. 1.

In FIG. 2, reference numeral 101 denotes a controller for receiving various status signals 1a to 1e from the system, outputting a row address strobe signal $\overline{\text{RAS}}$ (1f) necessary for the DRAM as the storage memory 307, column address strobe signals $\overline{\text{CASL}}$ (1h) and $\overline{\text{CASH}}$ (1g) for DRAM areas corresponding to even and odd addresses, and controlling between these signals, and multiplexed address bits AX9 to AX1 (1p); 102, a gate circuit for outputting system address bits A18 to A10 as row address outputs to the multiplexed address bits AX9 to AX1 (1p) in an access mode other than a DMA mode; 103, a gate circuit for outputting system address bits A9 to A1 as column address outputs to the multiplexed address bits AX9 to AX1 (1p) in an access mode other than the DMA mode; 104, a gate circuit for outputting system address bits A16 to A8 as row address outputs to AX9 to AX1 (1p) in the DMA operation mode; 105, a gate circuit for outputting system address bits A7 to A1 as a column address to the multiplexed address bits AX9 to AX3, and outputting outputs from the 2-bit counter 106 to the multiplexed address bits AX2 and AX1; 106, the 2-bit counter for counting a signal 1m as a clock output from the controller 101 in only the DMA operation mode; 1a, a DMA enable signal which goes to logic "0" level in a bus cycle of the DMA operation; 1b, a signal indicating a read or write cycle to the storage memory 307; and 1c, a system address bit A19. In this embodiment, when A19=1, the 512KB storage memory is selected. Reference numeral 1d denotes a signal which goes to "0" when lower 8 bits of the 16-bit data bus are valid. Only when the signal 1d is "0", the signal $\overline{\text{CASL}}$ (1h) is enabled.

Reference numeral 1e denotes a signal which goes to "0" when upper 8 bits of the 16-bit data bus are valid contrary to the signal 1d. Only when the signal 1e is "0", the signal $\overline{\text{CASH}}$ (1g) is enabled. Reference numeral 1f denotes a row address strobe signal indicating that the multiplexed address bits AX9 to AX1 define a row address; 1g, a column address strobe signal for activating upper bytes (odd addresses) of the storage memory 307; 1h, a column address strobe signal for activating lower bytes (even addresses) of the storage memory 307; 1j, a write enable signal which goes to "0" when data is written in the storage memory 307; and 1k, a strobe signal indicating a data switching timing to a peripheral section (e.g., the encoder/decoder 306) which serves as a transfer destination in the DMA transfer mode. Three pulses of the strobe signal 1k are output during one DMA cycle. Reference numeral 1*l* denotes a timing signal for changing an address to be output to the multiplex address outputs AX9 to AX1 between row and column addresses. When the signal 1*l* is "0", address data to be a column address is output. Reference numeral 1*m* denotes a clock signal for incrementing the 2-bit counter for changing lower 2 bits AX2 and AX1 of the column addresses to be (0, 0), (0, 1), (1, 0), and (1, 1) during one DMA cycle.

FIG. 3 shows the relationship among the system addresses and the row and column addresses output to the storage memory 307 in this embodiment.

In FIG. 3, reference symbols A18 to A0 denote address input signals bits; UBE, an upper byte enable signal; AX9 to AX1, DRAM multiplexed address signal bits; RA9 to RA1, DRAM row address signal bits; CA9 to CA1, DRAM column address signal bits; CASH, an upper byte DRAM CAS signal; and CASL, a lower byte DRAM CAS signal.

The operation of FIG. 2 described above will be described below with reference to the timing chart of FIG. 4.

In a normal memory access mode other than the DMA mode, the system address bit A19 (c1) is set to be "1" to signal that normal access of the storage memory 207 is performed in this bus cycle. At this time, since the signal DMA AK (1*a*) is kept at "1", the system address bits A18 to A10 as a row address are output to the multiplexed address bits AX9 to AX1.

When the signal $\overline{RAS}$ goes from "1" to "0", the DRAM latches the multiplexed address bits AX9 to AX1 therein in a known sequence.

The multiplexed address bits AX9 to AX1 are switched from the outputs from the gate circuit 102 to those from the gate circuit 103 in response to the signal 1*l*, and are output as the system address bits A9 to A1.

In order to set this address value as a column address, if the signal A0 (1*d*) is "0", the signal $\overline{CASL}$ (1*h*) goes from "1" to "0"; if the signal $\overline{UBE}$ (1*e*) is "0", the signal $\overline{CASH}$ (1*g*) goes from "1" to "0", thus allowing access of the DRAM constituting the storage memory 307.

With the above-mentioned control, A19 to A1 are directly supplied to the storage memory 307 as an address. The correspondence between An and AXm in this case is as shown in B of FIG. 3.

When A19=1 and the signal DMA AK (1*a*) indicating the DMA cycle goes to "0", the gate circuit 104 is enabled to output a row address, and the system address bits A16 to A8 are output to the multiplexed address bits AX9 to AX1. Similarly, after the signal $\overline{RAS}$ goes to "0", the gate circuit 105 is enabled in place of the gate circuit 104, and the system address bits A7 to A1 are output to the multiplexed address bits AX9 to AX3. At this time, the content of the 2-bit counter 106 which is reset at the beginning of each bus cycle is output to the multiplexed address bits AX2 and AX1, and is initially set to be (0, 0). At this time, an address value obtained by multiplying 4 with the system address bits A19 to A1 is supplied to the storage memory 307 as an address signal.

In this state, one-shot active-low pulses are output as the signals $\overline{CASL}$ and $\overline{CASH}$, thus executing access of addresses given by:

{(system address)×4}+0 and +1

Thereafter, the signal $\overline{RAS}$ is kept at "0", and a pulse indicating that DMA transfer for one word is completed is output to the peripheral section as a DMA transfer destination by the strobe signal 1*k*. In response to the signal 1*m*, the counter 106 is incremented by one to change the multiplexed address bits AX2 and AX1 from (0, 0) to (0, 1). Thereafter, one-shot pulses are output as the signals $\overline{CASL}$ and $\overline{CASH}$.

When the above operations are repeated, DMA transfer can be executed for addresses given by:

{(system address)×4}+2 and +3
{(system address)×4}+4 and +5
{(system address)×4}+6 and +7

In this case, the correspondence between the system address bits A16 to A1 and the row and column addresses of the storage memory 307 is as shown in C of FIG. 3.

Figure 4:
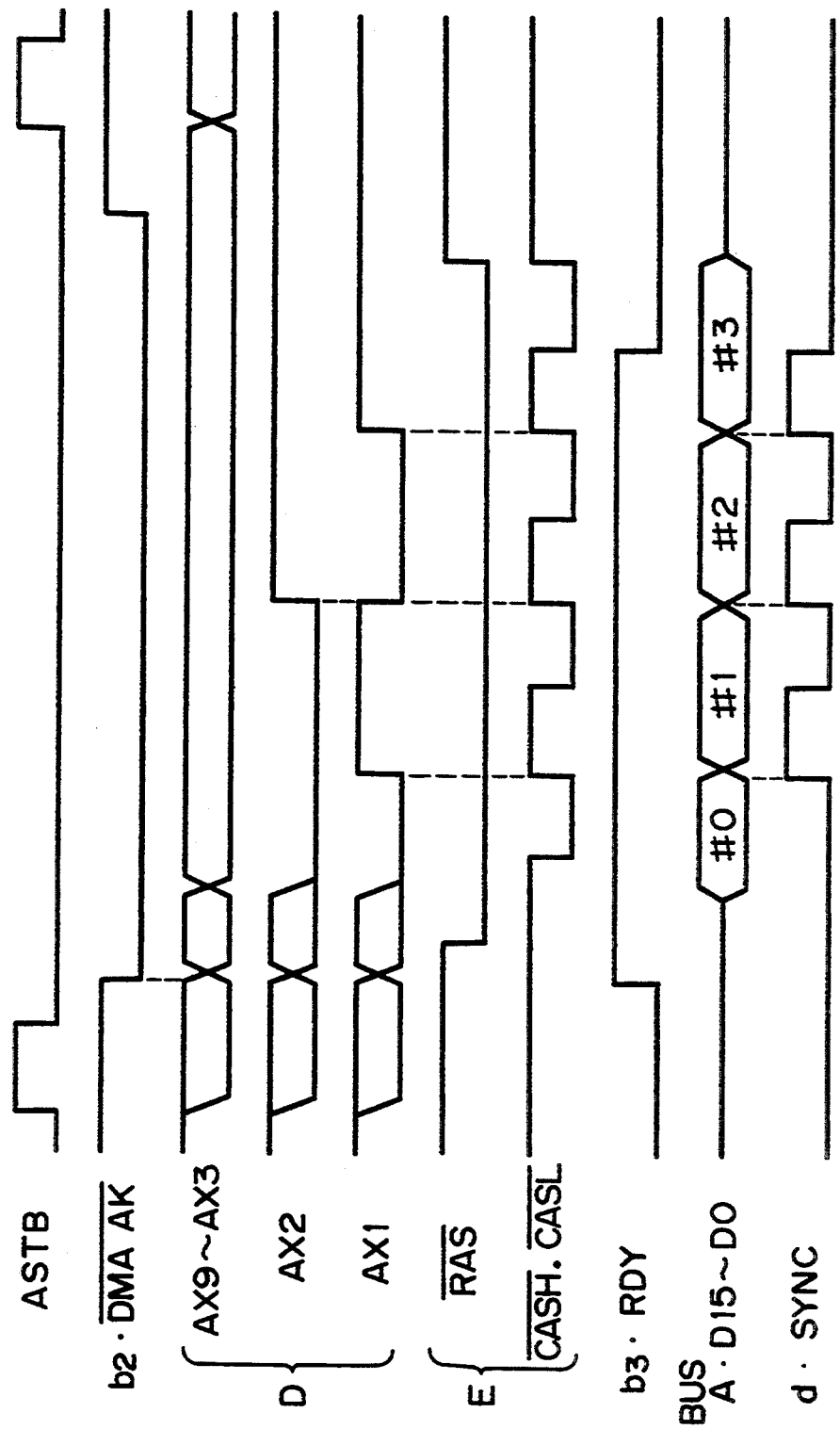
FIG. 4 is a timing chart for explaining an operation of this embodiment.

In FIG. 4 showing the timing chart of the principal signals in this embodiment, reference symbol ASTB denotes an address strobe signal indicating the beginning of a system bus cycle.

When the signal ASTB goes to "1", the memory control unit 308 receives the system address bits A19 to A0. In this embodiment, the 512KB storage memory is allocated on a memory space where the system address bit A19 is "1". If the system address bit A19 is "1", the system address bits A18 to A10 are output to the multiplexed address bits AX9 to AX1 (D).

When the signal DMA AK (b2) indicating that DMA transfer is performed in this bus cycle goes to "0", the address to be output to the multiplexed address bits AX9 to AX1 is changed to the system address bits A16 to A8.

At the same time, in order to prolong the bus cycle, more than normal, an RDY signal (b3) for the DMAC 302 is set to "1".

In order to cause the DRAM constituting the storage memory 307 to recognize the multiplexed address bits AX9 to AX1 as a row address, the signal $\overline{RAS}$ is set to "0". The remaining system address bits A7 to A1 are output to the multiplexed address bits as a column address, and the multiplexed address bits AX2 and AX1 are set to be "0".

If this DMA transfer is performed from the encoder/decoder 306 to the storage memory 307, first one-word data is output onto the system data bus. Thus, the signals $\overline{CASH}$ and $\overline{CASL}$ are set to "0", thus executing write access of addresses given by:

{(system address)×4}+0 and +1

Thereafter, the signals $\overline{CASH}$ and $\overline{CASL}$ are reset to "1", and the multiplexed address bits AX2 and AX1 are incremented by 1 to set (0, 1).

A one-shot pulse of the SYNC signal (d) for causing the encoder/decoder 306 to output the next data word is output. In response to the SYNC signal (d), the next data word is output onto the system bus.

When the signals $\overline{CASH}$ and $\overline{CASL}$ are set to "0" again, write access is performed for addresses given by:

{(system address)×4}+2 and +3

When the same operation is successively executed twice, DMA transfer of a total of four words can be attained.

Note that the RDY signal (b3) is set to "0" upon transfer of the fourth word, thus signaling to the DMAC that this bus cycle can be ended.

[Another Embodiment]

In the above-mentioned embodiment, a high-speed page mode (a row address is input first, and thereafter, only a column address is changed) as a kind of typical DRAM access methods is employed.

In this mode, a range of a given column address can be continuously accessed at high speed.

When a static column mode as another DRAM access method, is used, the signals $\overline{CASH}$ and $\overline{CASL}$ need not be turned on/off for every one-word transfer, and the same operation as described above is allowed.

In the above embodiment, continuous transfer is limited to four words. If a nibble mode is used, the same operation as described above is allowed.

In this mode, lower 2 bits of a column address are automatically generated by a DRAM. Thus, the 2-bit counter 106 shown in FIG. 2 can be omitted for the multiplexed address bits AX2 and AX1 shown in FIG. 4.

In the above embodiment, a high-speed access mode of the DRAM is utilized. However, if a static RAM (SRAM) whose access speed is sufficiently higher than a system bus cycle is used as the storage memory 307 of the above embodiment, the same effect can be obtained. In this case, address multiplexing like the multiplexed address bits AX9 to AX1 shown in FIG. 2 is not necessary, and the word switching timing in a continuous access mode is determined by the write or read signal for the SRAM.

As described above, according to this embodiment, address data supplied to the memory in only the DMA cycle is obtained by multiplying $2^n$ with address data supplied from the system, and $2^n$ words are transferred in one DMA cycle, thus obtaining the following effects:

(1) a time required for transferring one word can be shortened; and
(2) an occupation ratio of the system bus by DMA is decreased, and a processing capacity of the CPU can be increased.

As a result, in the facsimile apparatus employing the DMA access method of this embodiment, in processing for encoding original read data and DMA-transferring it to the storage memory 307, or processing for DMA-transferring encoded data in the storage memory 307 to the encoder/decoder 306 and printing it out by the recorder 305, even if an encoded data length in one main scan line is large, the time required for data transfer between the storage memory 307 and the encoder/decoder 306 can be shortened as compared to the one-line main scan time of the reader 303 and the one-line print-out time of the recorder 305, and high-speed, equal-speed reading and printing operations can be realized.

As described above, according to the present invention, even if an encoded data length in one main scan line is large, the time required for data transfer between the storage memory and the encoder/decoder can be shortened as compared to the one-line main scan time of the reader and the one-line print-out time of the recorder, and a facsimile apparatus which can perform efficient high-speed, equal-speed reading and printing operations can be provided.

As many apparently widely different embodiments of the present invention can be made without departing from the spirit and scope thereof, it is to be understood that the invention is not limited to the specific embodiments thereof except as defined in the appended claims.

What is claimed is:

1. A direct memory access method for data transfer between a memory and an encoder/decoder via a data bus, using a direct memory access (DMA) controller, wherein the encoder/decoder, having a buffer memory of plural word length, encodes image data read out by a reader and decodes encoded image data stored in the memory, said method comprising the steps of:

causing the DMA controller to inform a central processing unit (CPU) of a need to use the data bus in accordance with a DMA request signal from the encoder/decoder;

causing the DMA controller to output a reference address in accordance with an acknowledge signal from the CPU which allows the DMA controller to use the data bus;

generating a plurality of DMA access addresses based on the reference address output by an address generator other than the DMA controller; and performing DMA data transmission plural times between the memory and the encoder/decoder in accordance with the generated plurality of DMA access addresses.

2. The method according to claim 1, wherein the plurality of DMA access addresses are generated by mixing the reference address with a count value of an N-bit counter, and wherein the count value of the N-bit counter is incremented/decremented at every one word transfer, and a $2^N$ word DMA transfer is performed in one DMA cycle, in accordance with the plurality of DMA access addresses.

3. The method according to claim 1, wherein the reference address and a count value of a N-bit counter are mixed to generate the DMA access addresses.

4. The method according to claim 3, wherein the count value of the N-bit counter is incremented/decremented by one synchronized with each one-word transfer.

5. The method according to claim 3, wherein a number of the DMA access addresses which are generated from each of the reference addresses is $2^N$.

6. The method according to claim 1, wherein the encoder/decoder outputs the DMA request signal to the DMA controller when data of at least $2^N$ words is obtained.

7. The method according to claim 1, wherein the buffer memory in the encoder/decoder stores at least $2^N$ words of data, and if the buffer memory has vacant space being able to store at least $2^N$ words of data, the encoder/decoder outputs the DMA request signal to the DMA controller.

8. A direct memory access (DMA) apparatus for performing data transfer between a memory and an encoder/decoder via a data bus, using a direct memory access (DMA) controller, wherein the encoder/decoder having a buffer memory of plural word length encodes image data read out by a reader and decodes encoded image data stored in the memory, said apparatus comprising:

means for causing the DMA controller to inform a central processing unit (CPU) of a need to use the data bus in accordance with a DMA request signal from the encoder/decoder, wherein the DMA controller outputs a reference address in accordance with an acknowledge signal from the CPU which allows the DMA controller to use the bus;

input means for inputting the reference address output by said DMA controller in accordance with the acknowledge signal;

generating means for generating a plurality of DMA access addresses based on the reference address, wherein said generating means is different from the DMA controller; and transfer means for performing DMA data transfer plural times between said memory and the encoder/decoder in accordance with the plurality of DMA access addresses.

9. The apparatus according to claim 8, wherein said generating means has a N-bit counter, and mixes a count value of said N-bit counter with the reference address to generate the DMA access addresses.

10. The apparatus according to claim 9, wherein said generating means generates the DMA access addresses while the count value of said N-bit counter is incremented/decremented $2^N$ times.

11. The apparatus according to claim 9, wherein said generating means generates $2^N$ DMA access addresses from each of the reference addresses.

12. The apparatus according to claim 8, wherein the count value of said N-bit counter is incremented/decremented by one synchronized with each one-word data transfer.

13. The apparatus according to claim 8, wherein the encoder/decoder outputs the DMA request signal to the DMA controller when data of at least $2^N$ words is obtained, and wherein the DMA controller outputs the reference address in accordance with the DMA request signal.

14. The apparatus according to claim 8, wherein the buffer memory in the encoder/decoder stores at least $2^N$ words of data, and if the buffer memory has vacant space being able to store at least $2^N$ words of data, the encoder/decoder outputs the DMA request signal to the DMA controller.

* * * * *

UNITED STATES PATENT AND TRADEMARK OFFICE
CERTIFICATE OF CORRECTION

PATENT NO. : 5,408,615
DATED : April 18, 1995
INVENTOR(S) : YUUJI ISHIKAWA

It is certified that error appears in the above-identified patent and that said Letters Patent is hereby corrected as shown below:

IN THE DRAWINGS

Sheet 5 of 5, "FIG. 5" should read --FIG. 5 PRIOR ART--.

COLUMN 4

Line 49, "a" should read --a DMA--.

COLUMN 6

Line 35, "DMAmode;" should read --DMA mode;--.
Line 56, "if" should read --If--.

COLUMN 8

Line 66, "methods" should read --method--.

COLUMN 10

Line 25, "of a" should read --of an--.

UNITED STATES PATENT AND TRADEMARK OFFICE
CERTIFICATE OF CORRECTION

PATENT NO. : 5,408,615
DATED : April 18, 1995
INVENTOR(S) : YUUJI ISHIKAWA

It is certified that error appears in the above-identified patent and that said Letters Patent is hereby corrected as shown below:

COLUMN 11

Line 4, "has a" should read --has an--.

Signed and Sealed this

Fifth Day of September, 1995

Attest:

BRUCE LEHMAN

Attesting Officer     Commissioner of Patents and Trademarks